US012607462B2

(12) United States Patent
Tooley et al.

(10) Patent No.: US 12,607,462 B2
(45) Date of Patent: Apr. 21, 2026

(54) METHOD AND SYSTEM FOR WIRELESS VEHICLE LEVELING

(71) Applicants: Matthew John Tooley, Stafford, VA (US); Carla G Surratt, Stafford, VA (US)

(72) Inventors: Matthew John Tooley, Stafford, VA (US); Carla G Surratt, Stafford, VA (US)

( * ) Notice: Subject to any disclaimer, the term of this patent is extended or adjusted under 35 U.S.C. 154(b) by 220 days.

(21) Appl. No.: 18/364,797

(22) Filed: Aug. 3, 2023

(65) Prior Publication Data

US 2025/0044083 A1 Feb. 6, 2025

(51) Int. Cl.
 *G01C 9/02* (2006.01)

(52) U.S. Cl.
 CPC ..................................... *G01C 9/02* (2013.01)

(58) Field of Classification Search
 CPC .................................. G01C 9/02; G01C 21/16
 See application file for complete search history.

(56) References Cited

U.S. PATENT DOCUMENTS

| | | | |
|---|---|---|---|
| 8,265,542 B2 * | 9/2012 | Batcheller ................ | G09B 9/08 434/37 |
| 8,467,967 B2 * | 6/2013 | Loomis ................... | G01C 21/26 701/4 |
| 10,359,288 B2 * | 7/2019 | Yang .................... | G01C 22/006 |
| 10,890,925 B2 * | 1/2021 | Leonard ............... | G07C 5/0808 |
| 11,644,833 B2 * | 5/2023 | Wengreen ............. | B60W 30/18 701/23 |
| 11,755,041 B2 * | 9/2023 | Zhu ........................ | H04N 5/272 701/3 |
| 11,768,504 B2 * | 9/2023 | Ebrahimi Afrouzi .. | G06N 3/082 701/25 |
| 11,781,874 B2 * | 10/2023 | Sharma .................. | G06Q 10/02 701/533 |
| 11,854,380 B2 * | 12/2023 | Garceau ............... | G05D 1/0016 |
| 12,050,113 B1 * | 7/2024 | Pana ........................ | G01C 9/06 |
| 2023/0266756 A1 * | 8/2023 | Wengreen ............. | G05D 1/617 701/23 |
| 2023/0300579 A1 * | 9/2023 | Merwaday ............. | B60L 53/67 701/423 |
| 2025/0044083 A1 * | 2/2025 | Tooley ................... | G01C 21/16 |

* cited by examiner

*Primary Examiner* — Yaritza Guadalupe-McCall

(57) ABSTRACT

The present disclosure relates to a method and system for wireless vehicle leveling. The system incorporates a wireless remote sensor featuring an inertial measurement unit, comprising accelerometers, gyroscopes, and magnetometers, to precisely measure the vehicle's tilt in roll, pitch, and yaw axes. The sensor wirelessly communicates with a second computer equipped with a display, providing real-time visualization of the vehicle's current tilt and the necessary adjustments to attain a level position. Additionally, the invention encompasses techniques for eliminating zero-bias caused by magnetic fields and customizing the zero-bias calibration. The method is highly adaptable and compatible with various vehicle types, including recreational vehicles.

15 Claims, 6 Drawing Sheets

METHOD AND SYSTEM FOR WIRELESS VEHICLE LEVELING

BACKGROUND OF THE INVENTION

The present invention relates to the technical field of remote sensing and vehicle leveling systems. In the context of vehicles, such as recreational vehicles, achieving proper leveling is crucial for safety and comfort during use, especially when parked on uneven surfaces or campsites.

Existing leveling systems for vehicles typically rely on various remote sensors such as accelerometers, inclinometers, and pendulums to measure and report the tilt of the vehicle. However some of the conventional system may suffer from accuracy issues, susceptibility to external disturbances like magnetic field, and limited real-time visualization of the leveling process.

Therefore, there is a need for an improved method and system for accurately measuring the tilt of a vehicle in the x-axis (pitch), y-axis (roll, and z-axis (yaw) using a remote wireless sensor. The system should provide real-time visualization of the vehicle's tile and offer necessary corrections to achieve a level position at its four corners. Additionally, it should address zero-bias caused by external forces like magnetic fields and allow customization of zero-bias. Such a system, compatible with various vehicle types, including recreational vehicles, would greatly enhance leveling accuracy and user experience.

SUMMARY OF THE INVENTION

The present invention introduces an innovative method and system that revolutionizes vehicle leveling by accurately measuring a vehicle's tilt in the x-axis (pitch), y-axis (roll), and z-axis (yaw) using a wireless remote sensor. This cutting-edge sensor can be mounted anywhere in the vehicle, in any orientation, without necessitating any modifications to the vehicle or involving complicated wiring.

The wireless remote sensor seamlessly communicates with a second computer equipped with a display, offering real-time visualization of the vehicle's current tilt. What sets this system apart is its user-friendly design, allowing the driver to use it while still in the driver's seat to check the overall level of the site. This feature enables the driver to easily find the optimum spot at the site, facilitating a smooth and effortless leveling process.

Once parked at the chosen location, the user can continue to use the system to achieve optimum level at the touch of a button. The system intelligently computes and provides necessary corrections at the vehicle's four corners, ensuring a level position effortlessly and enhancing travel comfort and safety.

Moreover, the invention incorporates advanced techniques to eliminate zero-bias caused by external forces, such as magnetic fields, and offers users the flexibility to customize the zero-bias settings according to their preferences.

By revolutionizing vehicle leveling without complex modifications or wiring, this invention promises a seamless and user-friendly experience for leveling vehicles, making it an indispensable tool for travelers seeking optimum stability and comfort during their journeys.

DETAILED DESCRIPTION OF THE INVENTION

Figure 1:
FIG. 1 is a partial block diagram of a system implementing a wireless vehicle leveling system.

In the subsequent sections, specific embodiments of the invention will be presented in detail, along with reference to the accompanying figures. To maintain consistency, similar elements in different figures will be identified by using the same reference numerals.

Throughout the detailed description of these embodiments, various specific details will be provided to offer a comprehensive understanding of the invention's functionalities and operation. However, certain well-known features might not be described in detail to prevent unnecessary complexities that could obscure the core concepts of the invention. The aim is to present the invention's essential aspects clearly and concisely, allowing readers to grasp its novel contributions and potential applications effectively.

In a broad embodiment, the present invention encompasses a comprehensive method and system for vehicle leveling, designed to address the challenges of achieving accurate and efficient leveling on uneven terrains. The core of the system is an advanced Inertial Measurement Unit (IMU), integrating essential components such as an accelerometer, gyroscope, and magnetometer. These components work in tandem to precisely measure the vehicle's roll, pitch, and yaw angles, providing crucial data for the leveling process.

A distinguishing feature of the invention lies in its wireless capability. The IMU wirelessly communicates the real-time roll, pitch, and yaw data to a second computer equipped with display capabilities. This second computer serves as a control unit, executing further computations based on the received data to determine the necessary adjustments required for leveling the vehicle optimally.

Moreover, the invention is designed to provide users with enhanced control and customization options. By allowing the user to customize the zero-bias, the system enables fine-tuning of the leveling process, making it highly adaptable to different vehicle types and user preferences. The user can also enter and customize the dimensions of the vehicle and define the placement of the leveling jacks, ensuring precise and accurate computations for achieving the desired level position.

With this comprehensive method and system, users can effortlessly level their vehicles, including recreational vehicles, without the need for complex wiring or extensive modifications. The wireless communication and real-time visualization on the display unit allow the user to utilize the system effectively, even while in the driver's seat, to assess the overall site level and find the ideal spot for easy leveling.

In summary, the present invention represents a significant advancement in vehicle leveling technology, offering accuracy, convenience, and customization options. By leveraging the capabilities of the IMU and wireless communication, along with user-centric features like customizing zero-bias and vehicle dimensions, the system provides a comprehensive solution for leveling vehicles on various terrains.

Throughout this patent specification, it is important to clarify that the terms "tilt" and "level" are used interchangeably to refer to the measured roll, pitch, and yaw angles of the sensor. To provide a better understanding, "roll" represents the rotation about the X-axis, "pitch" denotes the rotation about the Y-axis, and "yaw" indicates the rotation about the Z-axis. These terms are consistently employed throughout the disclosure to describe the orientation and movement of the vehicle, ensuring clear and consistent communication of the invention's functionality.

Throughout this disclosure, the term "Smart device" as used herein means any portable electronic device with a display, wireless transceiver, and computing capabilities. Examples include smartphones, tablets, laptops, and other similar devices.

Throughout this patent specification, the term "Smart device" is consistently used to refer to any portable electronic device equipped with a display, wireless transceiver, and computing capabilities. Such devices include, but are not limited to, smartphones, tablets, laptops, and other similar devices. The use of this term is intended to encompass a wide range of electronic devices that are capable of running the software application and communicating with the sensor device to provide real-time visualization of the vehicle's tilt and necessary corrections.

As used in this patent specification, the terms "Vehicle leveling device" and "RV leveling device" both refer to a sensor device specifically designed for vehicle leveling applications. The device includes an inertial measurement unit (IMU) comprising an accelerometer, magnetometer, and gyroscope. It also incorporates a microprocessor or microcontroller with firmware that enables the sensor device to measure various parameters, including:

1. Acceleration in the x, y, and z axes.
2. Angular velocity in the x, y, and z axes.
3. Angle velocity in the x, y, and z axes.

The sensor device is equipped with capabilities to calibrate and remove zero-bias from both the accelerometer and magnetometer readings. This calibration process ensures accurate and reliable measurements, free from any offset or external interference that might affect the leveling system's performance.

In one or more embodiments, the sensor device utilizes a sophisticated microcontroller with a filtering mechanism, such as the Kalman filter, to fuse the measurements from its three sensors. This intelligent filtering system seamlessly integrates and processes the data acquired from the accelerometer, magnetometer, and gyroscope. By doing so, the sensor device effectively mitigates errors and eliminates drift that might occur in the individual sensor readings.

The application of the Kalman filter algorithm in the sensor device ensures that the roll, pitch, and yaw angles are accurately and consistently estimated, delivering reliable measurements even in dynamic and changing conditions. This advanced sensor fusion approach optimizes the overall performance of the leveling system, empowering users to experience real-time and dependable visualizations of their vehicle's tilt.

Moreover, the sensor device is designed with wireless communication capabilities, allowing it to transmit precise and calibrated data to a smart device. This enables users to have real-time access to the vehicle's tilt information, making it possible to use the system while still in the driver's seat. The system's user-friendly interface on the smart device provides visual cues for finding the optimum spot at a site, ensuring easy and efficient leveling.

Overall, the RV leveling system offers a versatile, reliable, and user-friendly solution for achieving optimum leveling, enhancing the overall convenience and comfort for RV owners and other vehicle users.

As used herein, the term "Vehicle" encompasses both powered and non-powered vehicles, trailers, or similar transportation devices. This broad definition includes, but is not limited to, cars, trucks, recreational vehicles (RVs), recreational vehicle trailers, and other similar vehicles. The term "Vehicle" applies to any mode of transportation designed for movement or towing, whether for personal or commercial purposes.

For the purpose of this patent specification, the term "microcontroller" refers to a compact integrated circuit that combines essential components of a computer, including a central processing unit (CPU), memory, and input/output peripherals, on a single chip. The microcontroller is designed to execute specific tasks or functions and is commonly used in embedded systems for real-time control and data processing applications.

In the context of the vehicle leveling system presented in this patent specification, the microcontroller serves as the core processing unit responsible for acquiring, processing, and fusing data from various sensors, including but not limited to accelerometers, gyroscopes, and magnetometers.

The microcontroller executes sophisticated sensor fusion algorithms, such as the Kalman filter, to combine data from multiple sensors and the internal model of the system. This fusion process optimally estimates the vehicle's orientation, including roll, pitch, and yaw angles, while mitigating errors, noise, and drift associated with individual sensors.

By utilizing a microcontroller with advanced sensor fusion capabilities, the vehicle leveling system achieves highly accurate and stable orientation estimation, even in dynamic conditions. The resulting real-time and precise tilt measurements enable users to make informed leveling adjustments, ensuring the vehicle achieves an optimal level position.

FIG. 1 illustrates a block diagram of the vehicle leveling system implementation. The diagram depicts a smart device (1) connected to a sensor (3) through a wireless communications link (2). When the sensor is operational and linked to the smart device, it calculates the roll, pitch, and yaw angles of the vehicle. The sensor then transmits this information to the smart device using the wireless communication link for further processing and visualization. The smart device serves as the central hub for real-time monitoring and displaying the vehicle's tilt angles, allowing the user to make necessary corrections for achieving a level position.

Figure 2:
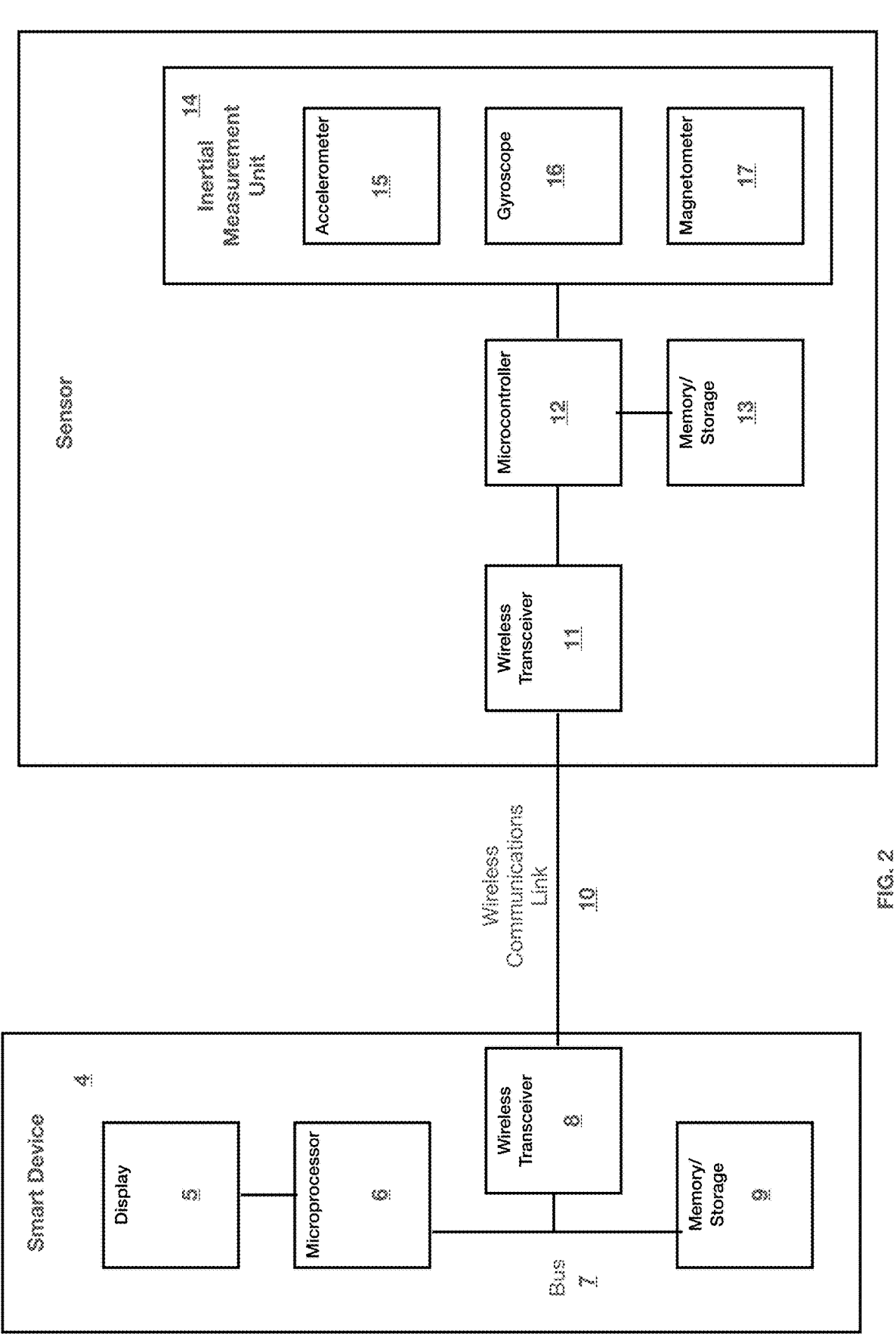
FIG. 2 is a partial block diagram showing additional details of a system implementing a wireless vehicle leveling system.

FIG. 2 presents a block diagram representing a specific embodiment of the present invention, providing further insights into the implementation of the leveling system. The diagram showcases a smart device (4) featuring a display (5) connected to a microprocessor (6) through a bus (7). The bus facilitates the connection of various components, including the display (5), wireless transceiver (8), and memory or storage (9), within the smart device.

In this particular embodiment, the sensor unit comprises a wireless transceiver (11) and a microcontroller (12) integrated with memory and storage (13). The sensor unit interfaces with an inertial measurement unit (IMU) (14)

housing an accelerometer (15), gyroscope (16), and magnetometer (17). The sensor unit communicates wirelessly with the smart device (4) through a dedicated wireless communications link (10).

The smart device serves as the central processing unit, receiving data from the sensor unit and executing calculations for real-time leveling measurements. It displays the roll, pitch, and yaw angles of the vehicle, allowing users to visualize the vehicle's tilt and make informed adjustments to achieve an optimal level position.

By employing wireless communication between the sensor unit and the smart device, this embodiment ensures flexibility and ease of installation. It eliminates the need for complicated wiring or modifications to the vehicle, enhancing the user experience and simplifying the setup process for the leveling system.

Figure 3:
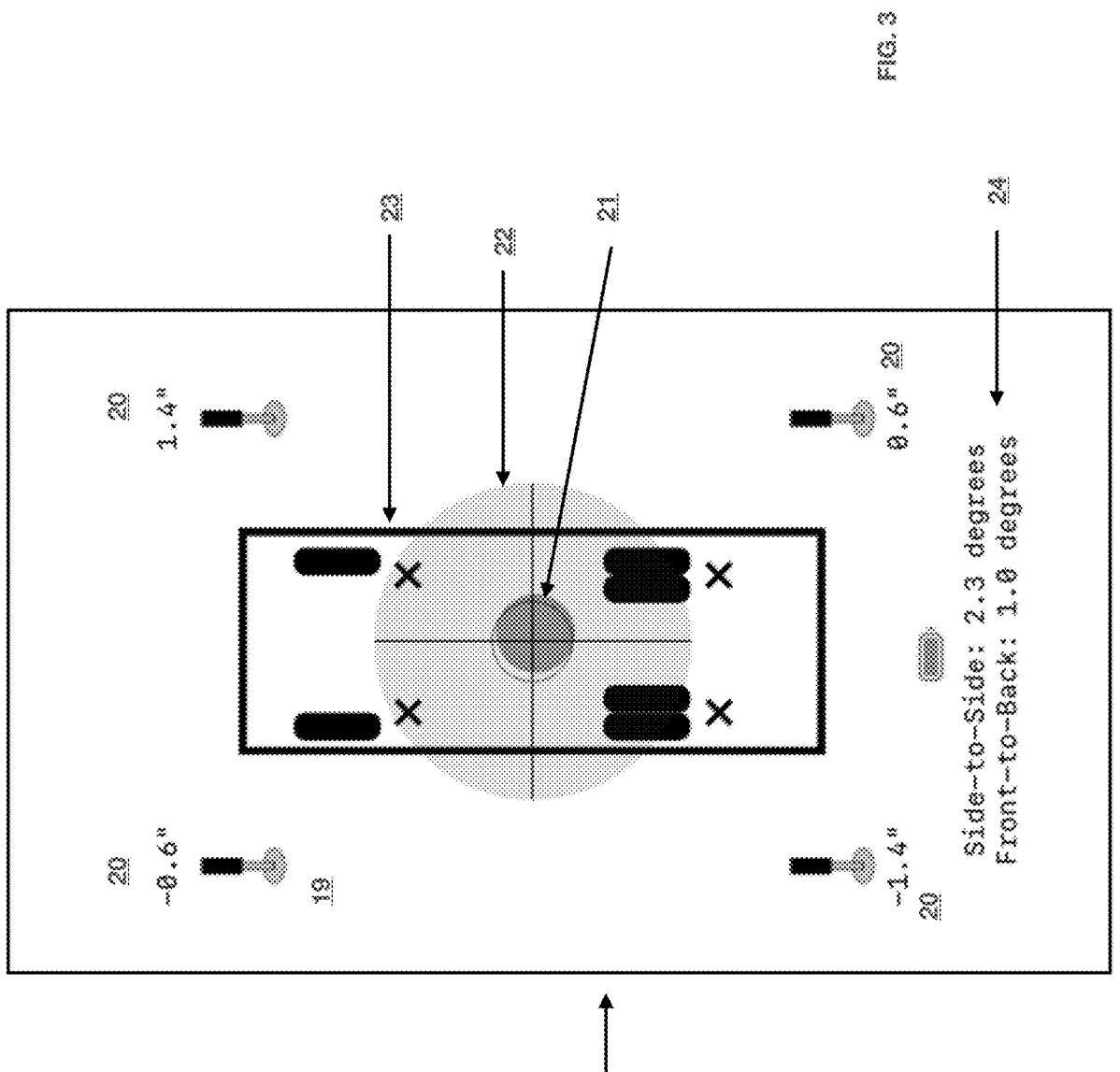
FIG. 3 illustrates a display screen of an embodiment of the software application on a smart device for use in an embodiment of the wireless vehicle leveling system.

FIG. 3 illustrates the primary user interface display (18) of the smart app, presenting essential information objects for the vehicle leveling system. The display is designed to offer a user-friendly and intuitive experience. The key elements on the display include:

1. Four Symbols representing Leveling Jacks (19): These symbols represent the leveling jacks installed on the vehicle. Each symbol corresponds to a specific corner of the vehicle's frame where a leveling jack is positioned.

2. Required Height Adjustment (20): For each leveling jack symbol, the display shows the required height adjustment value. This value indicates the amount each leveling jack needs to be raised or lowered to bring the vehicle to a level position where both the roll and pitch angles are zero.

3. Roll and Pitch Display (24): The display includes the real-time measurements of the vehicle's roll and pitch angles, labeled as "side-to-side" and "front-to-back," respectively. This information allows the user to monitor the vehicle's tilt in real-time.

4. Outline of a Vehicle (23): The display provides an outline representation of the vehicle, indicating its general shape.

5. Concentric Circles Overlay (22): Two concentric circles are overlaid on the outline of the vehicle. These circles serve as visual guides for when the measured roll and pitch angles are zero or when the sensor is level.

6. Filled Circle or Bubble (21): Positioned relative to the center of the concentric circles, the filled circle or bubble represents the current tilt of the vehicle. The color of the bubble indicates the connection status to the sensor: one color indicates a successful connection, while a different color denotes no connection.

This user interface display enables the user to visualize the vehicle's tilt status and the necessary adjustments required to achieve a level position. The real-time feedback facilitates efficient and precise leveling of the vehicle, enhancing the overall leveling experience. Moreover, the display's intuitive design allows users to make informed decisions while still in the driver's seat, helping them find the optimum spot at a site for easy leveling before parking the vehicle.

Figure 4:
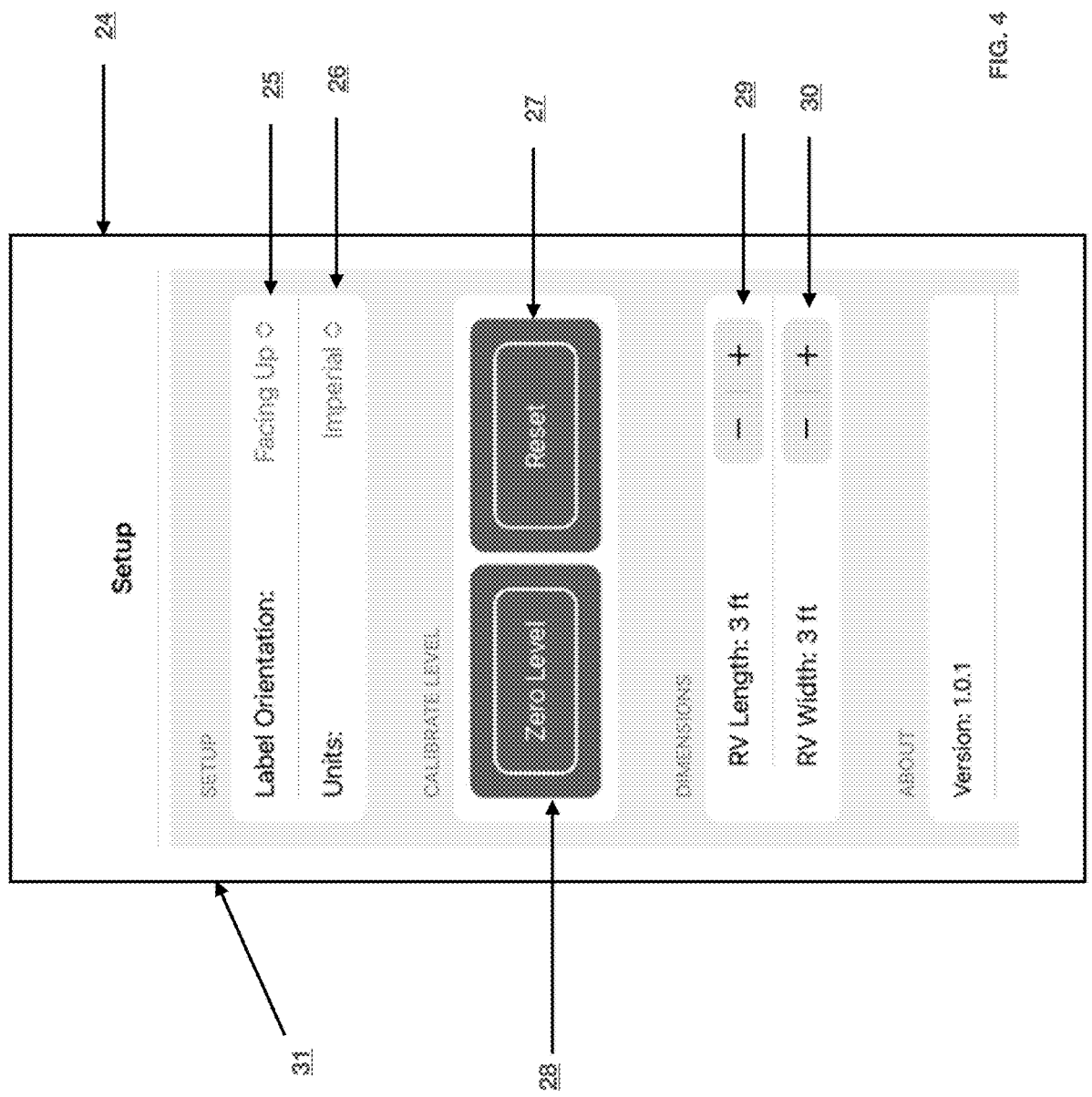
FIG. 4 illustrates a display screen of an embodiment of the software application on a smart device for use in an embodiment of the wireless vehicle leveling system.

FIG. 4 depicts the setup display (24) that is accessible when the user navigates to the configuration settings of the smart app. The setup display provides various user input fields to customize and optimize the vehicle leveling system. The key elements on this setup display include:

1. Mounting Orientation Input Field (25): This user input field allows the user to specify the mounting orientation of the sensor device. The options may include upside down, rotated left 90 degrees about the x-axis, rotated right 90 degrees about the y-axis, or rotated about the y-axis by +/−90 degrees. This feature ensures that the sensor's x, y, and z axes can be mapped to different orientations as per the user's specific mounting choice.

2. Units of Measurement Input Field (26): The user can select the preferred units of measurement for the leveling parameters displayed on the primary user interface. This input field allows users to choose between various measurement units, such as imperial or metric, based on their preference.

3. Zero Bias Setting Input Field (28): With this user input field, the user can set the zero bias of the sensor. Fine-tuning the zero bias allows for more precise leveling measurements, as it accounts for any inherent bias or error in the sensor readings.

4. Sensor Reset Input Field (27): This user input field enables the user to reset the sensor device to its initial state. Resetting the sensor can be helpful if any unexpected issues or errors arise during the leveling process.

5. Length and Width Input Fields (29, 30): The pair of user input fields allows the user to enter the dimensions of the vehicle between the leveling jacks. By providing the length and width measurements, the smart app can accurately calculate the required height adjustments at each corner of the vehicle's frame for optimal leveling.

The setup display offers a straightforward and user-friendly interface for configuring the vehicle leveling system to suit individual preferences and requirements. Users can easily customize the sensor orientation, select their preferred units of measurement, fine-tune the zero bias, and input the dimensions of the vehicle, enhancing the overall user experience and ensuring precise and efficient vehicle leveling.

Figure 5:
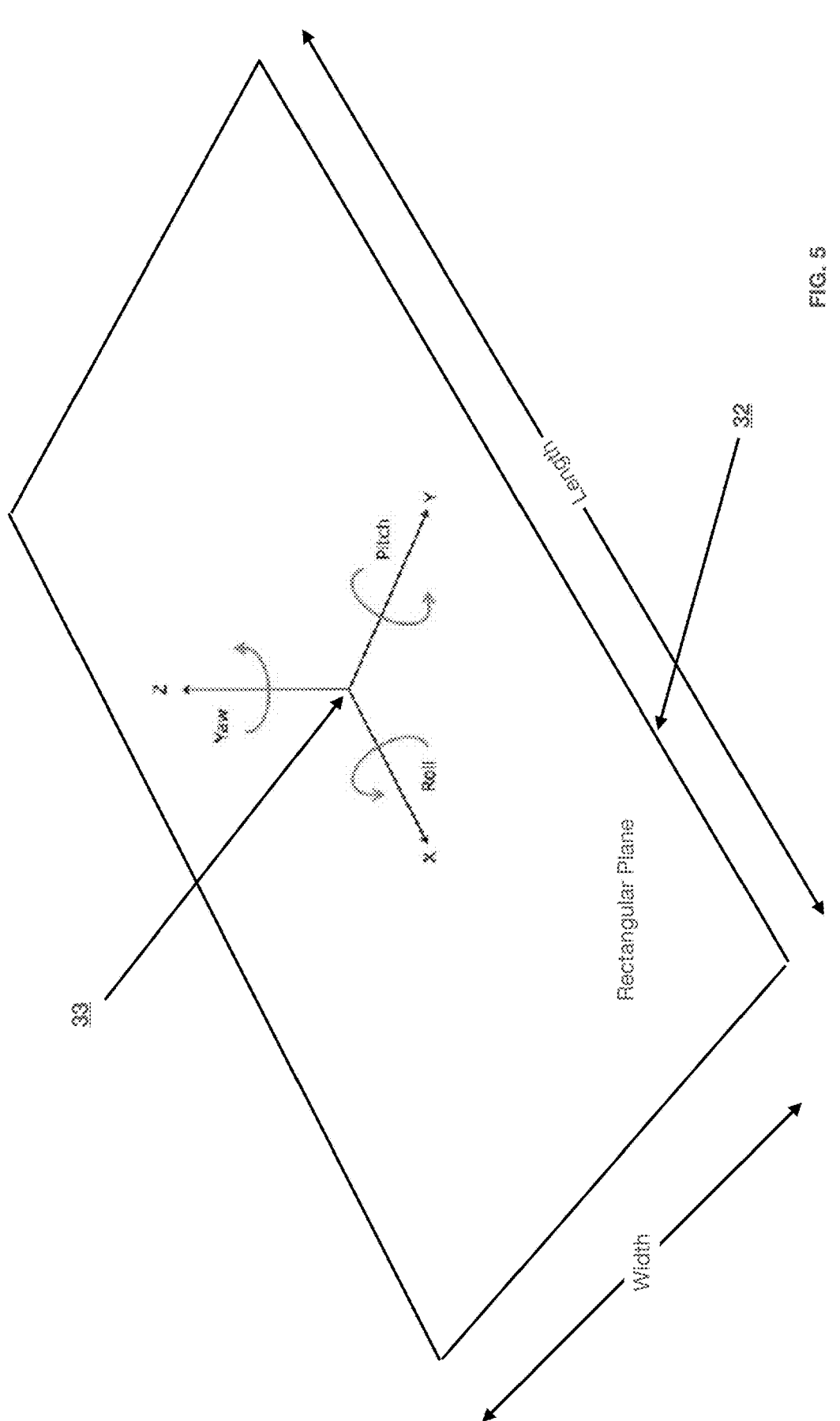
FIG. 5 illustrates the outline of the vehicle and axes for the roll, pitch, and yaw.

FIG. 5 illustrates a diagram of the vehicle's outline (32) based on the entered length and width measurements (29, 30) provided by the user in the setup display. The diagram also depicts the principal axes (33) of the vehicle, which are essential for understanding its roll, pitch, and yaw movements:

1. X-Axis: The x-axis represents the horizontal axis that runs from the front to the back of the vehicle. It is the axis for roll, which refers to the rotation of the vehicle about this axis.

2. Y-Axis: The y-axis represents the horizontal axis that runs from one side to the other side of the vehicle. It is the axis for pitch, which refers to the rotation of the vehicle about this axis.

3. Z-Axis: The z-axis represents the vertical axis that runs from the bottom to the top of the vehicle. It is the axis for yaw, which refers to the rotation of the vehicle about this vertical axis.

By visualizing the outline of the vehicle and understanding the principal axes, users can easily interpret the leveling information provided by the sensor device. This information is crucial for calculating the required height adjustments at each corner of the vehicle's frame, ensuring that the vehicle achieves an optimal level position. The diagram aids in visualizing the vehicle's orientation and facilitates precise leveling adjustments based on the roll, pitch, and yaw measurements obtained from the sensor device.

The leveling system, method, or apparatus described in this patent specification primarily focuses on recreational vehicles (RVs). While the system may have applications in other types of vehicles, such as cars, trucks, trailers, or non-powered vehicles, the embodiments presented herein are specifically tailored to address the unique leveling challenges and requirements of recreational vehicles. The leveling system's capabilities and features are optimized to ensure efficient and reliable leveling for RVs, enhancing the overall camping or traveling experience for RV owners.

It is important to note that although the embodiments are primarily described with reference to recreational vehicles, the concepts and principles presented in this patent specification can be adapted and extended to suit leveling systems for other types of vehicles. This flexibility and versatility highlight the system's potential applicability in various vehicle-leveling scenarios beyond recreational vehicles, providing a robust and comprehensive solution for achieving level positions in different vehicle types and applications.

As depicted in FIG. 5, the vehicle leveling system, method, or apparatus presented herein are specifically designed to level a recreational vehicle (RV) in relation to its two primary axes (33): side-to-side and front-to-back. For clarity, pitch refers to the angle of the RV's horizontal plane front-to-back, while roll represents the angle from side-to-side.

To achieve a level position, vehicles are equipped with jacks positioned near the corners of the frame that form an imaginary horizontal plane (32) that defines the RV's level state. By knowing the dimensions of this horizontal rectangular plane and the locations of the jacks at each corner, it becomes possible to calculate the precise adjustments needed at each corner. These adjustments are based on the roll and pitch measurements obtained from the remote sensor mounted on the vehicle.

Using the sensor's roll and pitch data, the system can accurately determine how much each corner of the RV should be raised or lowered to bring the vehicle to a level state, where both the roll and pitch angles are zero. This enables the sensor device to be mounted anywhere in the vehicle, without the need for complicated modifications or wiring. Thus, users can conveniently use the leveling system while still in the driver's seat to assess the overall site level and identify the optimal spot for parking the RV, streamlining the leveling process once parked.

In essence, the vehicle leveling system described herein simplifies and enhances the RV leveling experience by providing real-time roll and pitch data through a wireless remote sensor. This data empowers users to make well-informed adjustments, ensuring their RV achieves an optimum level position with ease and accuracy, both during the parking process and while parked at the campsite or location of choice.

In one or more embodiments, the sensor device is designed to be highly versatile in terms of mounting options within the vehicle. The smart device application provides a user-friendly interface that allows users to specify the orientation of the sensor device (designated as (25)) relative to the x, y, and z axes of the vehicle.

This unique feature enables the sensor device to be securely mounted in various configurations, including upside-down, rotated left by 90 degrees about the x-axis, rotated right by 90 degrees about the y-axis, or rotated about the y-axis by +/−90 degrees. Through the smart device application, users can precisely align the sensor's coordinate system with that of the vehicle, ensuring accurate and consistent leveling measurements, regardless of the mounting angle.

By incorporating this adaptable mounting capability, the vehicle leveling system can be effectively employed in diverse vehicle types, including recreational vehicles, without the need for extensive modifications or complicated adjustments. This flexibility enhances user convenience and simplifies the leveling process, as the system can be easily tailored to suit the specific vehicle's layout and mounting preferences, while maintaining the system's high level of accuracy and performance.

In certain embodiments, the smart device is equipped with a compatible wireless communication capability, such as Bluetooth, Bluetooth Low Energy (BLE), or any other suitable wireless communication protocol. This feature enables seamless communication between the smart device and the sensor device, facilitating the exchange of information and data.

The smart device can efficiently receive real-time measurements of roll, pitch, and yaw angles from the sensor device through the wireless communication link. Likewise, the smart device can transmit commands and configuration settings to the sensor device, allowing users to customize various parameters and calibration options.

By leveraging this wireless communication capability, users can enjoy a user-friendly and convenient experience, as they can interact with the vehicle leveling system through the smart device without the constraints of physical wired connections. This wireless functionality enhances the system's portability, ease of use, and overall performance, making it a versatile solution for leveling vehicles, particularly recreational vehicles, in various environments and scenarios.

In one or more embodiments of the present invention, the sensor's microcontroller incorporates an advanced algorithm that intelligently processes and combines data from multiple sensors, including the accelerometer, gyroscope, and magnetometer, to compute the roll, pitch, and yaw angles of the sensor. This algorithmic processing is crucial for accurate and reliable orientation estimation in a three-dimensional space.

To achieve robust orientation estimation, the present invention leverages the power of Kalman filters, which are widely recognized and extensively used recursive algorithms for sensor fusion and estimation in various fields. Kalman filters are particularly effective in scenarios where precise state estimation is essential, such as estimating orientation from data collected by Inertial Measurement Units (IMUs), which typically include accelerometers, gyroscopes, and magnetometers.

The Kalman filter plays a central role in removing noise and reducing drift from the sensor measurements. The filtering process begins with estimating the initial orientation using data from the accelerometer and magnetometer. However, these initial estimates may be prone to noise and drift over time, leading to inaccuracies.

To address this, the Kalman filter incorporates information from the gyroscope's angular velocity data to predict the new state (roll, pitch, and yaw) at each time step. By considering the time elapsed since the last measurement, the filter accounts for potential drift that may have occurred during that time. The Kalman gain, which represents the uncertainty of the sensor measurements, is then calculated. This gain is crucial in adjusting the predicted state based on the measured values from the accelerometer and magnetometer, giving higher priority to more reliable sensor data.

Through an iterative process of measurement updates and predictions for each sampling period, the Kalman filter continuously refines the orientation estimate. This iterative approach effectively fuses the data from the accelerometer, gyroscope, and magnetometer, resulting in a more accurate and stable estimation of the sensor's roll, pitch, and yaw angles. By mitigating individual sensor weaknesses and biases, the Kalman filter significantly improves orientation estimation in various applications, enhancing the overall performance and usability of IMU-based leveling systems employed in the present invention.

In one or more embodiments of the present invention, the leveling system employs trigonometry to calculate the height corrections required at the four corners of the vehicle's frame, where the leveling jacks are attached. This calculation is based on the roll and pitch angles obtained from the sensor device.

To begin the calculation, the distance from the center of the vehicle's rectangular frame to each corner is determined. This distance is essential for understanding the position of each corner relative to the center of the rectangle.

Once the distances to each corner are known, trigonometric principles are utilized to calculate the required height adjustment for each corner. By taking into account the roll and/or pitch angles, the system can determine how much each corner needs to be raised or lowered to achieve a level position.

Trigonometry enables precise calculations that consider the angular orientation of the vehicle, allowing the leveling system to accurately adjust the height of the jacks at each corner. This ensures that the vehicle's rectangular frame can be brought to a level position, aligning with the roll and pitch angles obtained from the sensor device.

By leveraging trigonometry in this manner, the leveling system provides an efficient and reliable method for achieving a level position, enhancing the overall stability and comfort of the vehicle during use.

Figure 6:
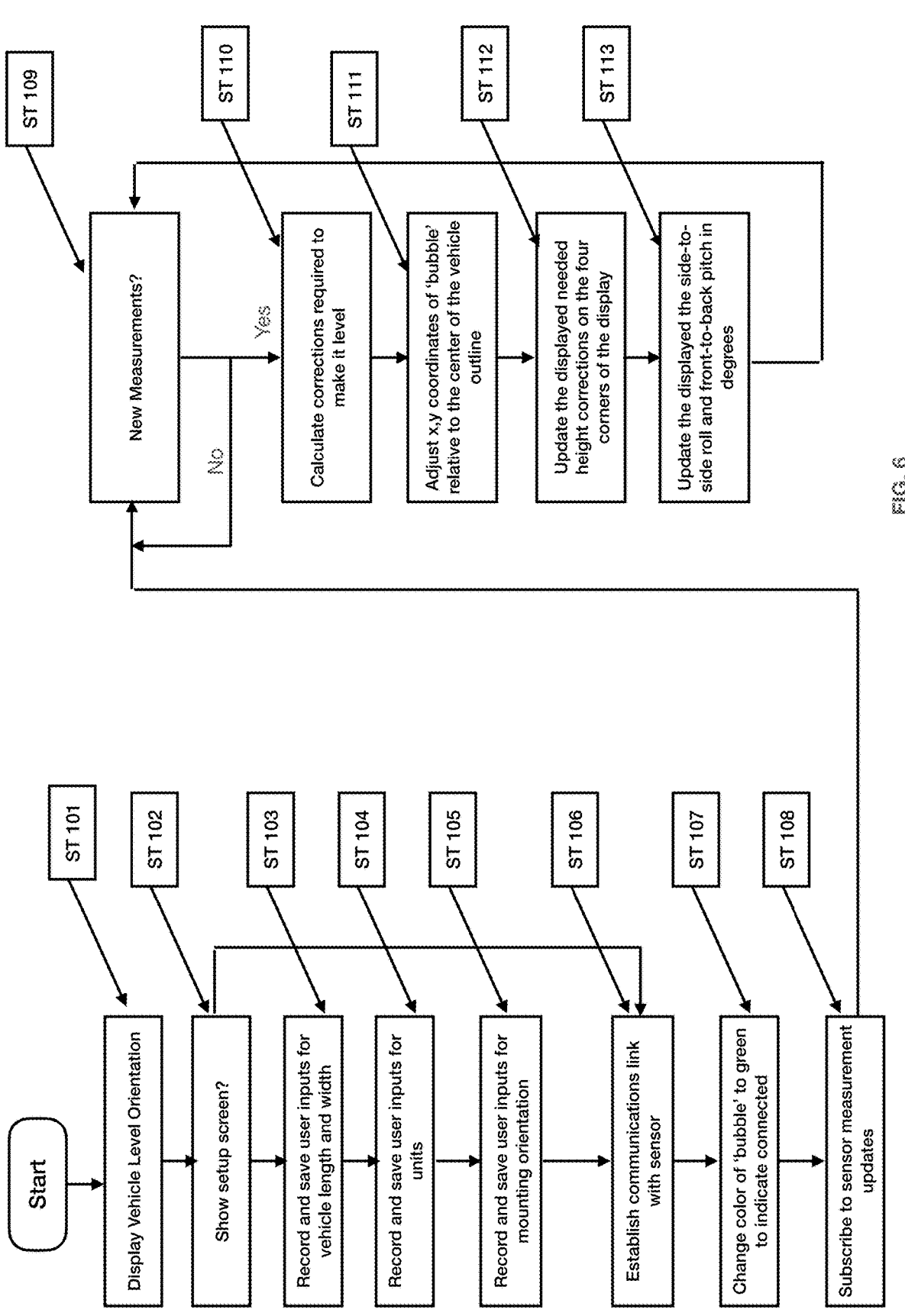
FIG. 6 illustrates an embodiment of a flowchart of a method of leveling a vehicle performed by a software application of a smart device in accordance to the present invention.

Thus, according to the disclosure herein, a method and system for leveling a vehicles, such as a recreational vehicle, can be provided as shown in FIG. 6. As shown in FIG. 1 and FIG. 2 a leveling system can be compromised of a sensor and a smart device with the sensor attached to the vehicle to measure and compute the roll, pitch, and yaw of the vehicle. The method starts (ST 101) with the smart application displaying the primary display as shown in FIG. 3. In the next step (ST 102) the user has the option of navigating to the setup display, FIG. 4, where the user has the option in next step (ST 103) to enter the vehicles length and width (29, 30), next the user can enter the units (ST 104) to be used for the displaying the leveling measurements (20), next (ST 105) the user enter the mounting orientation of the sensor. Next (ST 106) the method will attempt to establish a communications link with the sensor. The method next (ST 107) waits until the communications link is established and when it is established it provides feedback to the user by changing the color of the bubble (21) to indicate that the connection is established. Next the method (ST 108) sends a command to the sensor telling the sensor to publish or periodically send updated computed roll, pitch, and yaw from the sensor. Next the method (ST 109) waits for updated computed roll, pitch, and yaw from the sensor. When a new measurement is received (ST 110) the method uses prior length and width of the imaginary rectangular plane (32) representing the vehicle to calculate the height adjustments at each corner of the plane (32). Next (ST 111) the method moves the bubble object (21) on the screen to a position relative to center (22) based upon the update roll and pitch. Next (ST 112) the method updates the displayed height corrections (20) with the calculated corrections from ST 110. Next (ST 113) the method updates the primary display with the updated roll and pitch and labels them as side-to-side and front-to-back (24). After updating the display, the method repeats starting at step 109 (ST 109).

This system's key benefits include:

1. Real-Time and Accurate Leveling: The system provides real-time roll, pitch, and yaw measurements, enabling users to accurately level their vehicles with ease and precision. The intelligent sensor fusion and filtering algorithms ensure stable and reliable orientation estimation, even in dynamic conditions.

2. Wireless and User-Friendly Interface: The wireless communication between the sensor device and the smart device application allows for flexible installation and convenient monitoring of the leveling process from inside the vehicle. The user-friendly interface presents visual cues and intuitive displays to assist users in making informed leveling decisions.

3. Customization Options: The smart device application offers customization options, allowing users to input vehicle dimensions and calibrate the sensor device to optimize performance for their specific vehicle and preferences.

4. Versatility and Adaptability: The system's design and features cater specifically to recreational vehicles (RVs) but can be adapted and extended to suit leveling systems for various vehicle types and applications.

The vehicle leveling system, method, or apparatus described in this patent specification presents an innovative solution to address the challenges of leveling vehicles, particularly recreational vehicles (RVs). By employing advanced sensor fusion, wireless communication, and user-friendly interfaces, the system offers real-time and accurate leveling measurements, enhancing the overall user experience and convenience during the leveling process. The vehicle leveling system's versatility and adaptability make it a robust and comprehensive solution for achieving level positions in various vehicle types and applications.

It is important to note that the vehicle leveling system described herein is merely one example of how leveling systems can be implemented for vehicles. Different variations and implementations may exist, utilizing various sensors, communication protocols, user interfaces, and algorithms, all aimed at achieving the same goal of providing efficient and reliable vehicle leveling solutions The embodiments of the present invention described above demonstrate a comprehensive and innovative method and system for vehicle leveling. By leveraging the capabilities of an advanced Inertial Measurement Unit (IMU) with sensor fusion algorithms, wireless communication, and user-friendly smart device applications, the vehicle leveling system achieves real-time and accurate leveling measurements.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention.

The invention claimed is:

1. A vehicle leveling system comprising:
a sensor device attachable to a vehicle, said sensor device comprising an Inertial Measurement Unit (IMU) with an accelerometer, gyroscope, and magnetometer, and a microcontroller executing a sensor fusion algorithm including a Kalman filter or complementary filter together with calibration routines for zero-bias removal to compute real-time roll, pitch, and yaw angles of said vehicle with improved accuracy and stability;
a smart device with a display, a wireless transceiver, and a computing unit, said smart device being wirelessly connected to said sensor device, receiving said real-time roll, pitch, and yaw angles from said sensor device, and presenting said angles on said display as a graphical bubble level overlaid on an representation of said vehicle, the display further showing symbols corresponding to leveling jacks of the vehicle and required height adjustments for each jack position:

wherein said smart device calculates and displays height adjustments for leveling jacks of said vehicle based on said real-time roll, pitch, and yaw angles, and further provides real-time guidance for selecting a parking location by visualizing site-level tilt and projected jack adjustments while the vehicle is maneuvering or before leveling jacks are deployed, thereby enabling users to achieve an optimal level position of said vehicle on uneven terrains.

2. The vehicle leveling system of claim 1, wherein said smart device allows users to customize said system by entering the dimensions of said vehicle, defining the placement of leveling jacks, and fine-tuning zero-bias for leveling adjustments.

3. The vehicle leveling system of claim 1, wherein said smart device further provides graphical tilt cues on said display identifying relative high and low ground regions at the vehicle's perimeter thereby assisting the user in maneuvering the vehicle into an optimum parking position with minimal leveling adjustment required before deploying the leveling jacks prior to leveling.

4. The vehicle leveling system of claim 1, wherein the wireless transceiver of said sensor device communicates with said smart device using Bluetooth Low Energy (BLE).

5. The vehicle leveling system of claim 1, wherein said smart device provides a setup interface that allows the user to input vehicle dimensions, define jack placement, and enter zero-bias calibration values.

6. The vehicle leveling system of claim 1, wherein said smart device issues visual or audible alerts when the calculated leveling adjustments exceed a preset safety threshold or the known mechanical travel limits of the leveling jacks, thereby preventing unsafe or unattainable leveling operations.

7. The vehicle leveling system of claim 1, wherein said smart device records historical leveling data and calibration values for later reference by the user.

8. The vehicle leveling system of claim 1, wherein said smart device includes a drive-mode evaluation feature configured to display the overall tilt of a parking site prior to leveling, thereby guiding the user to an optimum spot before deploying the leveling jacks.

9. A method of leveling a vehicle, comprising:

attaching a sensor device to the vehicle, said sensor device comprising an inertial measurement unit (IMU) including an accelerometer, gyroscope, and magnetometer, and a microcontroller executing a sensor fusion algorithm including a Kalman filter or complementary filter together with calibration routines for zero-bias removal and drift correction to compute real-time roll, pitch, and yaw angles of said vehicle;

establishing a wireless communication link between said sensor device and a smart device;

transmitting said computed roll, pitch, and yaw angles from said sensor device to said smart device;

displaying, on said smart device, a graphical bubble level overlaid on a representation of said vehicle, the display further showing symbols corresponding to leveling jacks of the vehicle and required height adjustments for each jack position;

calculating, on said smart device, height adjustments for the leveling jacks based on said roll, pitch, and yaw angles; and providing real-time guidance for selecting a parking location by visualizing site-level tilt and projected jack adjustments while maneuvering the vehicle or before deploying the leveling jacks, thereby enabling the user to achieve an optimal level position of said vehicle on uneven terrain.

10. The method of claim 9, further comprising receiving user input of vehicle dimensions, jack placement, and zero-bias calibration values on said smart device to customize leveling calculations for different vehicle types.

11. The method of claim 9, wherein said smart device provides visual cues representing site- level tilt on said display to assist the user in locating an optimum parking spot prior to deploying the leveling jacks.

12. The method of claim 9, wherein said transmitting step comprises wirelessly transmitting said computed roll, pitch, and yaw angles from said sensor device to said smart device using Bluetooth Low Energy (BLE).

13. The method of claim 9, further comprising issuing visual or audible alerts on said smart device when the calculated leveling adjustments exceed a preset safety threshold or mechanical travel limits of the leveling jacks.

14. The method of claim 9, further comprising recording historical leveling data and calibration values on said smart device for later reference by the user.

15. The method of claim 9, wherein said providing real-time guidance further comprises displaying an overall tilt of a parking site in drive-mode evaluation, thereby guiding the user to an optimum spot before deploying the leveling jacks.

* * * * *